(12) United States Patent  (10) Patent No.: US 9,472,227 B2
Shin et al.                 (45) Date of Patent:     Oct. 18, 2016

(54) PERPENDICULAR MAGNETIC RECORDING MEDIA AND METHODS FOR PRODUCING THE SAME

(75) Inventors: Hi Shin, Singapore (SG); Iwao Okamoto, Singapore (SG)

(73) Assignee: WD Media (Singapore) Pte. Ltd., Irvine, CA (US)

( * ) Notice: Subject to any disclaimer, the term of this patent is extended or adjusted under 35 U.S.C. 154(b) by 216 days.

(21) Appl. No.: 13/166,002

(22) Filed: Jun. 22, 2011

(65) Prior Publication Data

US 2012/0164488 A1  Jun. 28, 2012

(30) Foreign Application Priority Data

Jun. 22, 2010 (JP) .................................. 2010-141238

(51) Int. Cl.
G11B 5/73   (2006.01)
G11B 5/738  (2006.01)

(52) U.S. Cl.
CPC ............. *G11B 5/7325* (2013.01); *G11B 5/738* (2013.01)

(58) Field of Classification Search
None
See application file for complete search history.

(56) References Cited

U.S. PATENT DOCUMENTS

| 6,013,161 | A | 1/2000 | Chen et al. |
| 6,063,248 | A | 5/2000 | Bourez et al. |
| 6,068,891 | A | 5/2000 | O'Dell et al. |
| 6,086,730 | A | 7/2000 | Liu et al. |
| 6,099,981 | A | 8/2000 | Nishimori |
| 6,103,404 | A | 8/2000 | Ross et al. |
| 6,117,499 | A | 9/2000 | Wong et al. |
| 6,136,403 | A | 10/2000 | Prabhakara et al. |
| 6,143,375 | A | 11/2000 | Ross et al. |
| 6,145,849 | A | 11/2000 | Bae et al. |
| 6,146,737 | A | 11/2000 | Malhotra et al. |
| 6,149,696 | A | 11/2000 | Jia |
| 6,150,015 | A | 11/2000 | Bertero et al. |
| 6,156,404 | A | 12/2000 | Ross et al. |
| 6,159,076 | A | 12/2000 | Sun et al. |
| 6,164,118 | A | 12/2000 | Suzuki et al. |

(Continued)

FOREIGN PATENT DOCUMENTS

| JP | 2009-059431 | | 3/2009 |
| JP | 2009059431 A | * | 3/2009 |
| WO | 2010035810 | | 4/2010 |

OTHER PUBLICATIONS

Japanese Office Action dated Jun. 17, 2014 for related Japanese Application No. 2010-141238, pp. 1-5.

*Primary Examiner* — Holly Rickman
*Assistant Examiner* — Lisa Chau
(74) *Attorney, Agent, or Firm* — Sughrue Mion, PLLC (57) ABSTRACT

[Problem] An object is to provide a perpendicular magnetic recording medium that can realize both improvement in crystal orientation and refinement of crystal grain size and can achieve a higher recording density and a higher SN ratio, and a method of manufacturing the same.

[Solution] A perpendicular magnetic recording medium 100 of the present invention is a perpendicular magnetic recording medium 100 having a base plate 100, and a laminate film including a first ground layer 150*a* provided on the base plate 100, a second ground layer 150*b* provided on the first ground layer 150*a*, and a main recording layer 160 provided on the second ground layer 150*b* and containing a magnetic material having a granular structure, wherein the magnetic material which constitutes the main recording layer 160 contains a CoCrPt alloy, and a material which constitutes the second ground layer 150*b* contains an Ru—Co oxide alloy.

11 Claims, 5 Drawing Sheets

(56) References Cited

U.S. PATENT DOCUMENTS

| | | |
|---|---|---|
| 6,200,441 B1 | 3/2001 | Gornicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |

(56) References Cited

U.S. PATENT DOCUMENTS

| | | |
|---|---|---|
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B1 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 2002/0034665 A1* | 3/2002 | Nakazawa et al. ..... 428/694 TS |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0214588 A1* | 9/2005 | Iwasaki ............... G11B 5/7325 428/831 |
| 2005/0263401 A1 | 12/2005 | Olsen et al. |
| 2006/0057431 A1* | 3/2006 | Tamai et al. ............... 428/836.2 |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2008/0057348 A1* | 3/2008 | Shimizu .................. G11B 5/65 428/833 |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0142624 A1* | 6/2009 | Takahoshi et al. ......... 428/846.6 |
| 2009/0169922 A1 | 7/2009 | Ishiyama |
| 2009/0191331 A1 | 7/2009 | Umezawa et al. |
| 2009/0197119 A1* | 8/2009 | Kong et al. .................. 428/800 |
| 2009/0202866 A1 | 8/2009 | Kim et al. |
| 2009/0311557 A1 | 12/2009 | Onoue et al. |
| 2010/0067149 A1* | 3/2010 | Bian .................. B82Y 25/00 360/254 |
| 2010/0143752 A1 | 6/2010 | Ishibashi et al. |
| 2010/0188772 A1* | 7/2010 | Sasaki .................... C23C 14/14 360/75 |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0296200 A1* | 11/2010 | Iwasaki ............... G11B 5/8404 360/294 |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0111257 A1* | 5/2011 | Kurokawa et al. ........... 428/800 |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |

(56) References Cited

U.S. PATENT DOCUMENTS

| | | |
|---|---|---|
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Gregory et al. |

\* cited by examiner

PERPENDICULAR MAGNETIC RECORDING MEDIA AND METHODS FOR PRODUCING THE SAME

TECHNICAL FIELD

The present invention relates to a perpendicular magnetic recording medium installed in an HDD (hard disk drive) or the like of a perpendicular magnetic recording type, and a method of manufacturing the same.

BACKGROUND ART

With increase in capacity of information processing in recent years, various information recording technologies have been developed. In particular, the surface recording density of an HDD using a magnetic recording technology is continuously increasing at an annual rate of approximately 100%. Recently, an information recording capacity exceeding 320 gigabytes/platter with a 2.5-inch diameter of a magnetic recording medium for use in an HDD or the like has been demanded, and in order to satisfy such a demand, an information recording density exceeding 500 gigabytes/square inch is required to be realized.

In order to achieve high recording density in a magnetic recording medium for use in an HDD or the like, a perpendicular magnetic recording type has been suggested in recent years. In a perpendicular magnetic recording medium used for the perpendicular magnetic recording type, an easy axis of magnetization of a granular magnetic layer (a magnetic layer having a granular structure) is adjusted so as to be oriented in a perpendicular direction with respect to a base surface. The perpendicular magnetic recording type is more suitable for increasing a recording density than a conventional in-plane magnetic recording type, since the perpendicular magnetic recording type can suppress a so-called thermal fluctuation phenomenon that a recording signal is lost due to the thermal stability of the recording signal is impaired by a superparamagnetic phenomenon.

As a perpendicular magnetic recording medium used for the perpendicular magnetic recording type, a magnetic recording medium where a backing layer, an orientation control layer, a magnetic recording layer, and a protective layer are stacked on a non-magnetic base plate has been suggested (for example, see Patent Document 1). In such a magnetic recording medium, the magnetic recording layer is constituted with use of a Co alloy material having a hexagonal close packed structure (hcp structure), and the orientation control layer is composed of an intermediate layer that improves the characteristics of the magnetic recording layer and a seed layer that adjusts the crystal orientations of the intermediate layer and the magnetic recording layer. The intermediate layer is deposited by sputtering using Ru or a Ru alloy having the hcp structure, and composed of a first intermediate layer (first ground layer) that is formed under a low-pressure condition, and a second intermediate layer (second ground layer) that is formed under a high-pressure condition.

PRIOR ART DOCUMENT

Patent Document

Patent Document 1: Japanese Unexamined Patent Application Publication No. 2009-059431

SUMMARY OF THE INVENTION

Problem to be Solved by the Invention

By the way, for the magnetic recording medium of the perpendicular magnetic recording type, improvement of crystal orientation and refinement of crystal grain size (particle separation) of the magnetic recording layer are important in order to realize a higher recording density and a higher SN ratio. In the magnetic recording medium according to Patent Document 1, the crystal orientation is refined by forming the first intermediate layer under a low-pressure condition and the crystal grain size of the magnetic recording layer is refined by forming the second intermediate layer under a high-pressure condition to suppress bonding between crystal grains by a void generated therebetween.

In the magnetic recording medium according to Patent Document 1, however, since forming the second intermediate layer under a high-pressure condition is required for refinement of crystal grain size of the magnetic recording layer, there is the problem that the crystal orientation of a Co alloy material or the like used as a material of the magnetic recording layer degrades as the pressure at the time of film formation increases. This causes the problem that improvement of the crystal orientation of the magnetic recording layer cannot necessarily be sufficient, since the contribution of the second intermediate layer to improvement of the crystal orientation of the magnetic recording layer is smaller than that of the first intermediate layer.

The present invention has been made in view of these circumstances, and an object thereof is to provide a perpendicular magnetic recording medium that can realize both improvement of crystal orientation and refinement of crystal grain size and can achieve a higher recording density and a higher SN ratio, and a method of manufacturing the same.

Means for Solving the Problem

A perpendicular magnetic recording medium of the present invention is a perpendicular magnetic recording medium having a base plate, and a laminate film including a first ground layer provided on the base plate, a second ground layer provided on the first ground layer, and a magnetic layer provided on the second ground layer and containing a magnetic material having a granular structure, wherein the magnetic material which constitutes the magnetic layer contains a CoCrPt alloy, and a material which constitutes the second ground layer contains an Ru—Co oxide alloy.

Regarding the perpendicular magnetic recording medium of the present invention, it is preferred that the material which constitutes the second ground layer be an Ru-xCoO alloy, where x ranges from 0.2 mol to 5 mol.

Regarding the perpendicular magnetic recording medium of the present invention, it is preferred that the film thickness of the second ground layer ranges from 2 nm to 20 nm.

Regarding the perpendicular magnetic recording medium of the present invention, it is preferred that the second ground layer be formed by sputtering using an Ru—CoO alloy or an Ru—$Co_3O_4$ alloy as a target.

Regarding the perpendicular magnetic recording medium of the present invention, it is preferred that the second ground layer be formed under the condition of an Ar atmosphere at a gas pressure in the range of 3 Pa to 10 Pa.

A method of manufacturing a perpendicular magnetic recording medium of the present invention is a method of manufacturing a perpendicular magnetic recording medium having a base plate, and a laminate film including a first ground layer provided on the base plate, a second ground layer provided on the first ground layer, and a magnetic layer provided on the second ground layer and containing a magnetic material having a granular structure, wherein the second ground layer is formed by sputtering using an Ru—Co oxide alloy as a target.

Effect of the Invention

According to the present invention, it is possible to provide a perpendicular magnetic recording medium that can realize both improvement in crystal orientation and refinement of crystal grain size and can achieve a higher recording density and a higher SN ratio, and a method of manufacturing the same.

EMBODIMENT OF THE INVENTION

An embodiment of the present invention will be described in detail below with reference to the attached drawings.

Figure 1:
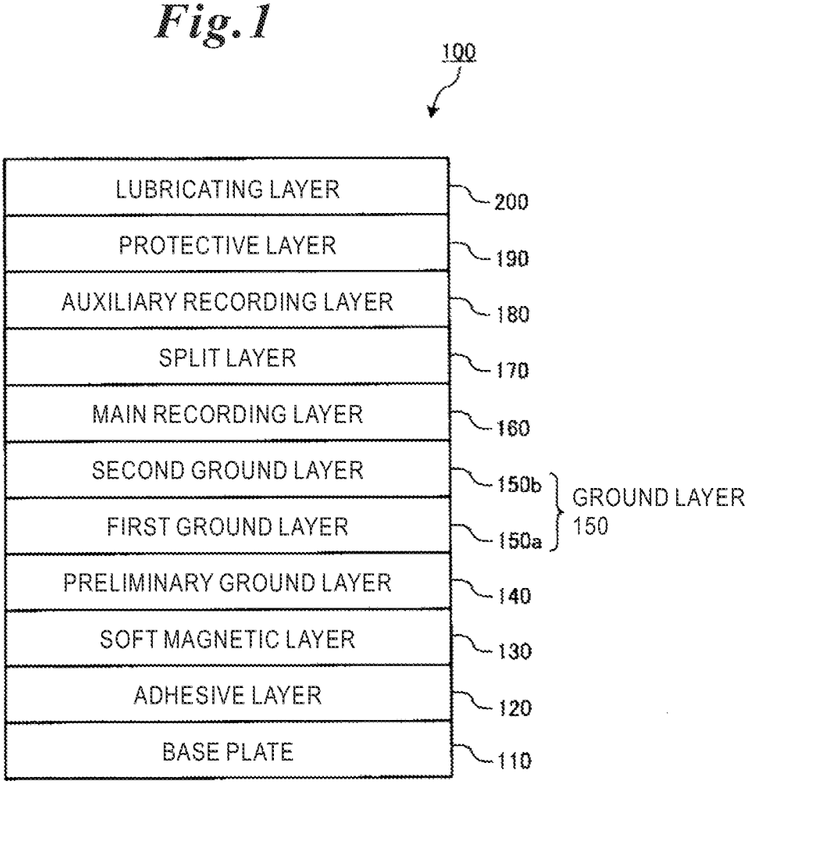
FIG. 1 is a descriptive diagram of a laminate structure of a perpendicular magnetic recording medium according to an embodiment of the present invention.

FIG. 1 is a diagram for describing the configuration of a perpendicular magnetic recording medium 100 according to the embodiment of the present invention. The perpendicular magnetic recording medium 100 shown in FIG. 1 has a laminate film including at least a magnetic layer on a base plate 110. The laminate film is mainly composed of a adhesive layer 120, a soft magnetic layer 130, a preliminary ground layer 140, a ground layer 150 (a first ground layer 150a, a second ground layer 150b), a main recording layer 160, a split layer 170, an auxiliary recording layer 180, a protective layer 190, and a lubricating layer 200.

As the base plate 110, for example, a glass disk molded in a disk shape by direct-pressing amorphous aluminosilicate glass can be used. Note that the kind, size, thickness, and others of the glass disk are not particularly restricted. A material of the glass disk can be, for example, aluminosilicate glass, soda lime glass, soda aluminosilicate glass, aluminoborosilicate glass, borosilicate glass, quartz glass, chain silicate glass, or glass ceramic, such as crystallized glass. This glass disk is sequentially subjected to grinding, polishing, and chemical strengthening, thereby allowing the smooth non-magnetic base plate 110 made of a chemically-strengthened glass disk to be obtained.

On the base plate 110, the adhesive layer 120 to the auxiliary recording layer 180 are sequentially formed by DC magnetron sputtering, and the protective layer 190 can be formed by CVD. Thereafter, the lubricating layer 200 can be formed by dip coating. The configuration of each layer will be described below.

The adhesive layer 120 is formed in contact with the base plate 110, and provided with a function of increasing adhesion strength between the soft magnetic layer 130 formed thereon and the base plate 110. It is preferred that the adhesive layer 120 be a film of amorphous alloy, such as a CrTi-type amorphous alloy, a CoW-type amorphous alloy, a CrW-type amorphous alloy, a CrTa-type amorphous alloy, or a CrNb-type amorphous alloy. The film thickness of the adhesive layer 120 can be set, for example, in the range of approximately 2 nm to 20 nm. The adhesive layer 120 may be a single layer or may have a laminate structure.

The soft magnetic layer 130 acts to converge a writing magnetic field from the head when a signal is recorded in a perpendicular magnetic recording type, thereby supporting easy writing of the signal to a magnetic recording layer and density growth. As a soft magnetic material, not only a cobalt-type alloy, such as CoTaZr, but also a material that exhibits a soft magnetic property, such as an FeCo-type alloy, such as FeCoCrB, FeCoTaZr, or FeCoNiTaZr, or a NiFe-type alloy, can be used. The soft magnetic layer 130 can be configured to be provided with AFC (antiferromagnetic exchange coupling) by interposing a spacer layer made of Ru approximately in the middle of the soft magnetic layer 130. This configuration can reduce perpendicular components of magnetization extremely, thereby reducing noise generated from the soft magnetic layer 130. In the configuration of interposition of the spacer layer in the soft magnetic layer 130, the film thickness of the soft magnetic layer 130 can be set to about 0.3 nm to 0.9 nm for the spacer layer and about 10 nm to 50 nm for each of upper and lower layers of the soft magnetic material.

The preliminary ground layer 140 is provided with a function of promoting crystal orientation of the ground layer 150 formed thereon and a function of controlling a fine structure, such as grain size. Though the preliminary ground layer 140 may have an hcp structure, it is preferred that the preliminary ground layer 140 have a face-centered cubic structure (fcc structure) in which a (111) face is oriented so as to be parallel to a main surface of the base plate 110. As a material of the preliminary ground layer 140, for example, Ni, Cu, Pt, Pd, Ru, Co, Hf, or an alloy containing these metals as a main component and added with at least one of V, Cr, Mo, W, Ta, and the like can be selected. Specifically, NiV, NiCr, NiTa, NiW, NiVCr, CuW, CuCr, or the like can be suitably selected. The film thickness of the preliminary ground layer 140 can be set in the range of about 1 nm to 20 nm. The preliminary ground layer 140 may also have a laminate structure.

The ground layer 150 has an hcp structure, is provided with a function of promoting crystal orientation of magnetic crystal grains in the hcp structure of the main recording layer 160 formed thereon, and a function of controlling a fine structure, such as grain size, and serves as a so-called foundation for a granular structure of the main recording layer. Ru has the same hcp structure as Co, and has a crystal lattice space close to that of Co, and therefore Ru can successfully orient magnetic particles containing Co as a main component. Therefore, higher crystal orientation of the ground layer 150 can improve the crystal orientation of the main recording layer 160 more, and refinement of grain size of the ground layer 150 can cause refinement of grain size of the main recording layer. Though Ru is a typical material of the ground layer 150, a metal, such as Cr or Co, or an oxide can also be added to the ground layer 150. The film thickness of the ground layer 150 can be set in the range of about 5 nm to 40 nm, for example.

The ground layer 150 is composed of an Ru-containing film of a two-layer structure, and includes the first ground layer 150a deposited on the preliminary ground layer 140 and the second ground layer 150b deposited on the first ground layer 150a. The first ground layer 150a and the second ground layer 150b are formed under different film formation conditions. An Ar gas pressure is made relatively higher when the second ground layer 150b on the upper side is formed than when the first ground layer 150a on the lower side is formed. Since a free travel distance of sputtered plasma ions becomes shorter as the gas pressure increases, a film formation rate becomes slower, and crystal orientation can be improved. Further, as the gas pressure increases, the size of a crystal lattice becomes smaller. Since the size of a crystal lattice of Ru is larger than that of Co, the crystal orientation of a granular layer of Co can be improved further by making the crystal lattice of Ru smaller so as to become closer to that of Co.

The second ground layer 150b is composed of a material containing an Ru—Co oxide alloy. Since the second ground layer 150b contains an Ru—Co oxide alloy, a crystal grain boundary made of oxide is formed in the second ground layer 150b to promote interparticle separation, and also functioning to improve crystal orientations of Ru which constitutes the ground layer 150 and the main recording layer 160. This is presumably because Co atoms generated by partial decomposition (reduction) of a Co oxide combines with Ru atoms to form an Ru—Co compound (alloy) at a step of film formation of the second ground layer 150b by sputtering.

Further, it is preferred that the second ground layer 150b be an Ru-xCoO alloy (x ranges from 0.2 mol to 5 mol). The second ground layer 150b having a composition in this range makes both an effect of promotion of interparticle separation and an effect of improvement of crystal orientation possible.

It is preferred that the film thickness of the second ground layer 150b be in the range of 2 nm to 20 nm. Since the film thickness of the second ground layer 150b in the range of 2 nm to 20 nm maximizes both the effect of promotion of interparticle separation and the effect of improvement of crystal orientation, recording and reproduction characteristics of the medium are improved. It is particularly preferred that the film thickness of the second ground layer 150b be in the range of 5 nm to 15 nm, and it is further preferred that it be in the range of 5 nm to 10 nm.

Further, it is preferred that the second ground layer 150b be formed by sputtering with use of an Ru—CoO alloy or an Ru—$Co_3O_4$ alloy as a target. Since sputtering with use of these targets causes the Co oxide to segregate in an Ru crystal grain boundary, separation or isolation of Ru crystal grains, or Co crystal grains grown thereon is promoted. Therefore, a perpendicular magnetic recording medium having a high SN ratio can be realized.

Further, it is preferred that the second ground layer 150b be formed under the condition of an Ar atmosphere at a gas pressure of 3 Pa to 10 Pa. Since formation of the second ground layer 150b under this condition causes a void between crystal grains of the second ground layer 150b, separation or isolation between the grains is achieved, so that a medium noise characteristic can be reduced.

Further, the gas pressure for sputtering of the first ground layer 150a and the gas pressure for sputtering of the second ground layer 150b may be made different from each other. Specifically, by making the gas pressure for sputtering of forming the second ground layer 150b higher than the Ar gas pressure for forming the first ground layer 150a side, the grain size of a magnetic particle can be refined with crystal orientation of the main recording layer 160 thereon kept well.

The main recording layer 160 has a columnar granular structure in which a grain boundary is formed by segregation of a non-magnetic substance containing an oxide as a main component around magnetic particles of a ferromagnetic body containing a Co—Pt-type alloy as a main component. For example, by film formation using a target obtained by mixing $SiO_2$ or $TiO_2$ into a CoCrPt-type alloy, a granular structure in which a grain boundary is formed by segregation of $SiO_2$ or $TiO_2$ that is a non-magnetic substance around magnetic particles (grains) made of the CoCrPt-type alloy and in which the magnetic particles are grown in a columnar shape can be formed.

Note that the above-described substances used in the main recording layer 160 are examples, not limitations. The CoCrPt-type alloy may be an alloy obtained by adding at least one of B, Ta, Cu, and the like in CoCrPt. Further, the non-magnetic substance for forming a grain boundary can be an oxide, such as silicon oxide ($SiO_2$), titanium oxide ($TiO_2$), chrome oxide ($Cr_2O_3$), zirconium oxide ($ZrO_2$), tantalum oxide ($Ta_2O_5$), cobalt oxide (CoO or $Co_3O_4$), by way of example. It is also possible to use not only one kind of oxide but also two or more kinds of oxides in combination.

The split layer 170 is provided between the main recording layer 160 and the auxiliary recording layer 180, and has a function of adjusting the strength of exchange coupling between these layers. Since this can adjust the strength of magnetic coupling between the main recording layer 160 and the auxiliary recording layer 180 and between adjacent magnetic particles in the main recording layer 160, it is possible to improve recording and reproduction characteristics, such as an overwrite characteristic or an SNR characteristic while keeping a magnetostatic value, such as Hc or Hn relating to an anti-thermal-fluctuation characteristic.

It is preferred that, in order to prevent inheritance of crystal orientation from lowering, the split layer 170 be a layer containing Ru or Co with an hcp structure as a main component. As an Ru-type material, other than Ru, a material obtained by adding another metal element, oxygen, or an oxide in Ru can be used. As a Co-type material, a CoCr alloy or the like can be used. Specifically, Ru, RuCr, RuCo, Ru—$SiO_2$, Ru—$WO_3$, Ru—$TiO_2$, CoCr, CoCr—$SiO_2$, CoCr—$TiO_2$, or the like can be used. Note that, though a non-magnetic material is generally used for the split layer 170, the split layer 170 may have weak magnetism. Further, in order to obtain a good exchange coupling strength, it is preferred that the film thickness of the split layer 170 be in the range of 0.2 nm to 1.0 nm.

The auxiliary recording layer 180 is a magnetic layer magnetically approximately continuous in an in-plane direction of the main surface of the base plate. Since the auxiliary recording layer 180 has magnetic interaction (exchange coupling) with the main recording layer 160, it is possible to adjust a magnetostatic characteristic, such as a coercive force Hc or an inverted magnetic domain nucleation magnetic field Hn, which aims at improving the anti-thermal-fluctuation characteristic, the OW (overwrite) characteristic, and the SNR. As a material of the auxiliary recording layer 180, a CoCrPt-type alloy can be used, and further an additive, such as B, Ta, or Cu, may be added therein. Specifically, CoCrPt, CoCrPtB, CoCrPtTa, CoCrPtCu, CoCrPtCuB, or the like can be used. The film thickness of the auxiliary recording layer 180 can be set, for example, in the range of 3 nm to 10 nm.

Note that "magnetically continuous" means that magnetism is continuous without interruption. "Approximately continuous" means that, when seen as a whole, the auxiliary recording layer 180 does not have to be a single magnet and may have partially-discontinuous magnetism. That is, the auxiliary recording layer 180 is only required to have magnetism continuous over (so as to cover) a plurality of aggregates of magnetic particles. As long as this condition is satisfied, the auxiliary recording layer 180 may have a structure in which Cr has been segregated, for example.

The protective layer 190 is a layer for protecting the perpendicular magnetic recording medium 100 from an impact from the magnetic head or corrosion. The protective layer 190 can be formed by forming a film containing carbon by CVD. A carbon film formed by CVD is preferred, since in general it is improved in film hardness as compared with one formed by sputtering, and therefore can protect the perpendicular magnetic recording medium 100 more effectively from an impact from the magnetic head. The film thickness of the protective layer 190 can be set, for example, in the range of 2 nm to 6 nm.

The lubricating layer 200 is formed to prevent the protective layer 190 from being damaged when the magnetic head comes in contact with the surface of the perpendicular magnetic recording medium 100. For example, the lubricating layer 200 can be formed by dip-coating PFPE (perfluoropolyether). The film thickness of the lubricating layer 200 can be set, for example, in the range of 0.5 nm to 2.0 nm.

Figure 2:
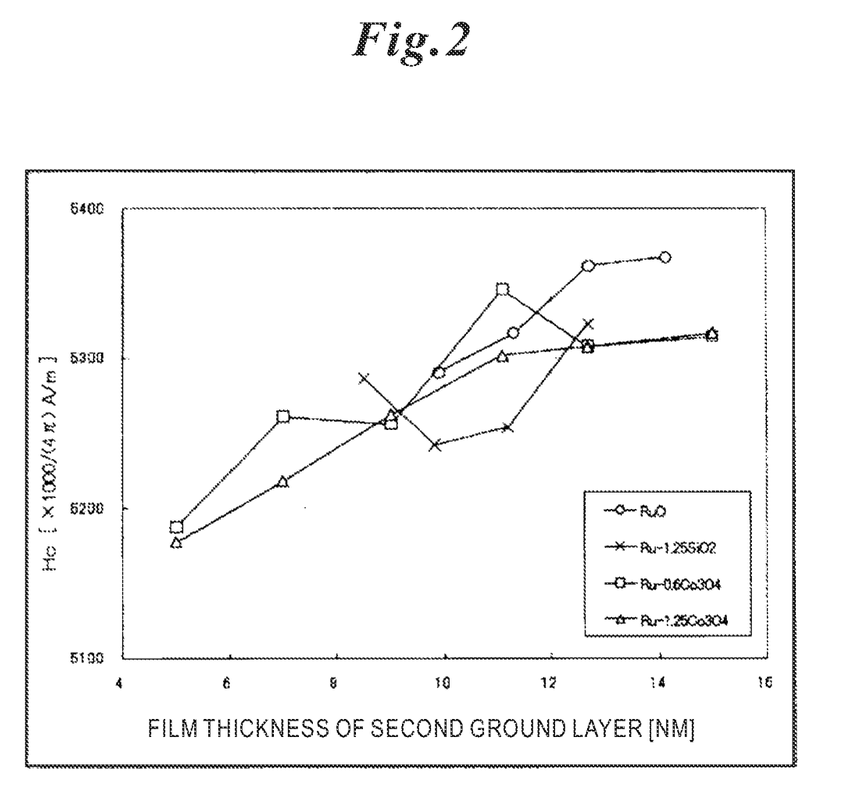
FIG. 2 is a graph showing a relationship between the film thickness of a second ground layer and a coercive force (Hc)

Here, a relationship between the film thickness of the second ground layer 150b and coercive force (Hc) was examined. The result is shown in FIG. 2. FIG. 2 shows a case where the second ground layer 150b contained RuO, a case where the second ground layer 150b contained Ru-1.25$SiO_2$, a case where the second ground layer 150b contained Ru-0.6$Co_3O_4$, and a case where the second ground layer 150b contained Ru-1.25$Co_3O_4$. Note that the coercive force was measured at room temperature by using a Kerr-effect-type magnetometer. At that time, the magnetic field was swept from +15000 Oe (1000/(4π) A/m) to −15000 Oe (1000/(4π) A/m) at a constant rate for 20 seconds. As can be seen from FIG. 2, the coercive forces in the cases where the second ground layer 150b contained an Ru—Co oxide alloy were approximately equal to those in the cases where the second ground layer 150b contained RuO or Ru—$SiO_2$.

Figure 3:
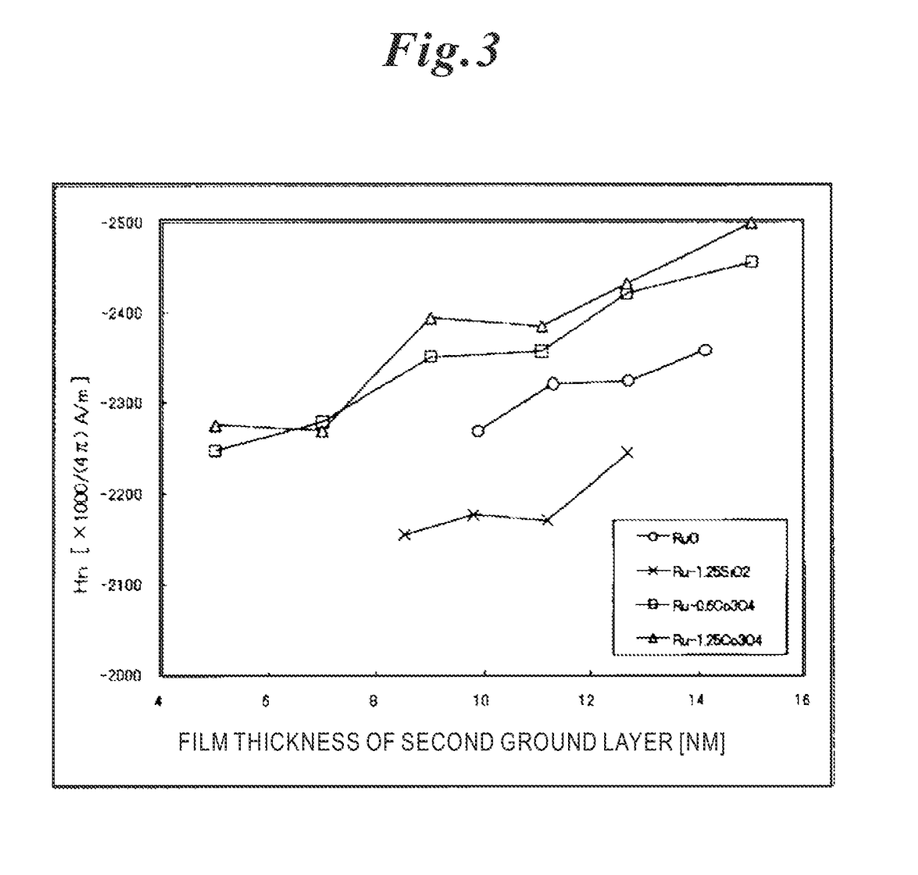
FIG. 3 is a graph showing a relationship between the film thickness of the second ground layer and a nucleation magnetic field (Hn)

Next, a relationship between the film thickness of the second ground layer 150b and a nucleation magnetic field (Hn) was examined. The result is shown in FIG. 3. As shown in FIG. 3, the nucleation magnetic field was weaker in the case where the second ground layer 150b contained Ru-1.25$SiO_2$ than in the case where the second ground layer 150b contained RuO (the absolute value lowered by up to 100 Oe (1000/(4π) A/m)). Further, the nucleation magnetic field was stronger in the case where the second ground layer 150b contained Ru-0.6$Co_3O_4$ or in the case where the second ground layer 150b contained Ru-1.25$Co_3O_4$ than in the case where the second ground layer 150b contained RuO (the absolute value increased by 50 Oe (1000/(4π) A/m) to 100 Oe (1000/(4π) A/m)). The nucleation magnetic field was measured at room temperature by using a Kerr effect evaluation apparatus. As can be seen from FIG. 3, a stronger nucleation magnetic field than in the cases where the second ground layer 150b contained RuO or Ru—$SiO_2$ was obtained by the second ground layer 150b was an Ru—Co oxide alloy. Since a medium fringe characteristic (an anti-erase characteristic at the time of writing on an adjacent track) is improved more as the nucleation magnetic field becomes stronger, the second ground layer 150b containing the Ru—Co oxide alloy can be expected to improve the medium fringe characteristic.

Figure 4:
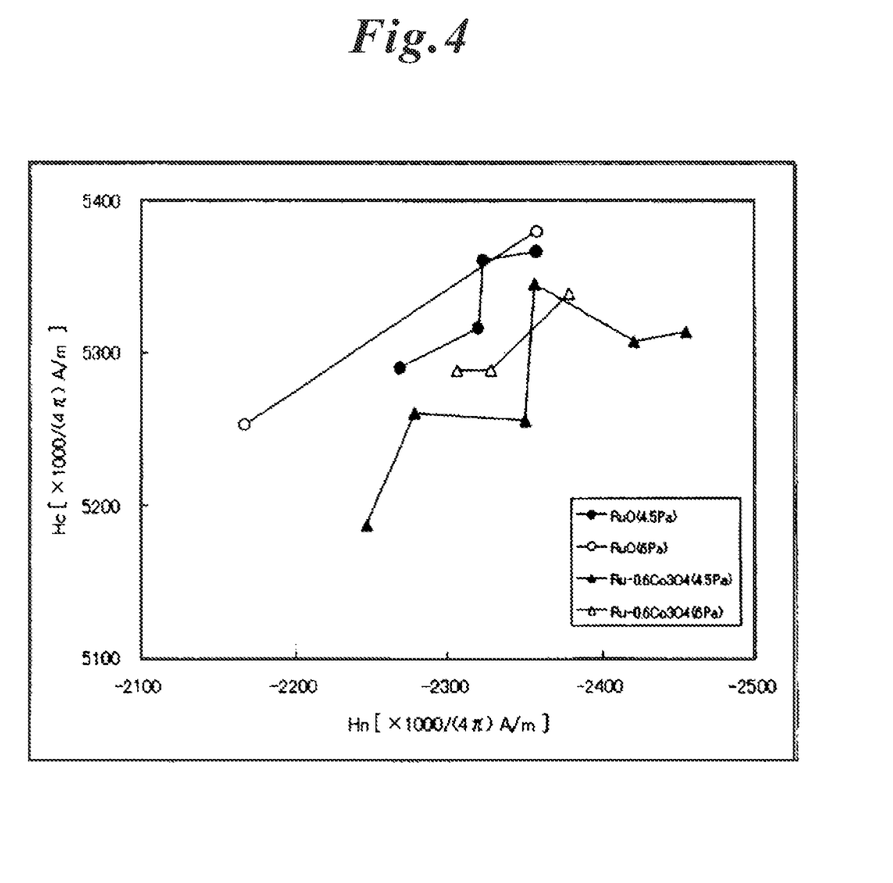
FIG. 4 is a graph showing a relationship between the coercive force (Hc) and the nucleation magnetic field (Hn)

Next, a relationship between the coercive force (Hc) and the nucleation magnetic field (Hn) was examined. The result is shown in FIG. 4. As shown in FIG. 4, even at the gas pressure of 4.5 Pa and even at the gas pressure of 6 Pa, an absolute value |Hn| of the nucleation magnetic field at the same Hc increased (+50 Oe (1000/(4π) A/m) to 100 Oe (1000/(4π) A/m)) in the case where the second ground layer 150b contained Ru-0.6$Co_3O_4$ as compared with the case where the second ground layer 150b contained RuO. As described above, since the increase of the nucleation magnetic field (Hn) is obtained even at an equal coercive force (Hc), the second ground layer 150b containing the Ru—Co oxide alloy can be expected to improve the fringe characteristic without causing deterioration of the OW characteristic of the medium.

Figure 5:
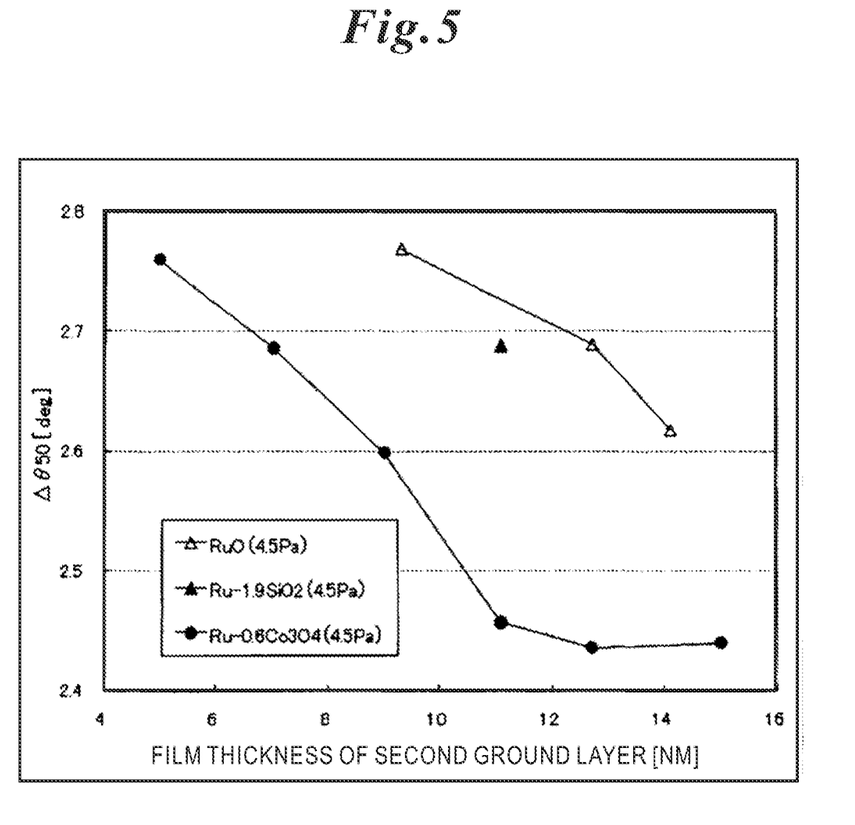
FIG. 5 is a graph showing a relationship between the film thickness of the second ground layer and crystal orientation dispersion ($\Delta 50$).

Next, a relationship between the film thickness of the second ground layer 150b and crystal orientation dispersion (Δ50) was examined. The result is shown in FIG. 5. FIG. 5 shows a case where the second ground layer 150b contained RuO (2 kppm) (a gas pressure of 4.5 Pa), a case where the second ground layer 150b contained Ru-1.9$SiO_2$ (a gas pressure of 4.5 Pa), and a case where the second ground layer 150b contained Ru-0.6$Co_3O_4$ (a gas pressure of 4.5 Pa). Note that the crystal orientation dispersion was measured by using SmartLab, an X-ray diffractometer, manufactured by RIGAKU Corporation with an X-ray power of 45 kV and 200 mA. As can be seen from FIG. 5, the crystal orientation dispersion (Δ50) was lower and accordingly the orientation was higher in the case where the second ground layer 150b contained an Ru—Co oxide alloy than in the cases where the second ground layer 150b was RuO or Ru—$SiO_2$.

Thus, it was found that, in the case where a material which constituted the second ground layer contained the Ru—Co oxide alloy, magnetic characteristics equivalent to those in the case where the second ground layer 150b was RuO or Ru—$SiO_2$ were produced and refinement of crystal grain size was achieved. It was also found that, in the case where a material which constituted the second ground layer contained the Ru—Co oxide alloy, crystal orientation higher than that in the case where the second ground layer 150b was RuO or Ru—$SiO_2$ was produced. Therefore, a perpendicular magnetic recording medium having such a second ground layer can realize both improvement in crystal orientation and refinement of crystal grain size and can achieve a higher recording density and a higher SN ratio.

(Example)

Next, an example performed to clarify the effect of the present invention will be described.

A glass disk was formed by molding amorphous aluminosilicate glass in a disk shape by direct-pressing. This glass disk was sequentially subjected to grinding, polishing, and chemical strengthening, and thus a base plate which was a smooth non-magnetic disk base made of a chemically-strengthened glass disk was obtained. The base plate was a base plate for a 2.5-inch magnetic disk being 65 mm in diameter, 20 mm in inner diameter, and 0.635 mm in disk thickness. From observation of surface roughness of the base plate obtained with an AFM (atomic force microscope), it was confirmed that the base plate had a smooth surface with 2.18 nm in Rmax and 0.18 in Ra. Note that Rmax and Ra adhere to Japanese Industrial Standards (JIS).

Next, the adhesive layer 120, the soft magnetic layer 130, the preliminary ground layer 140, the first ground layer 150a, the second ground layer 150b, the main recording layer 160, the split layer 170, and the auxiliary recording layer 180 were sequentially formed on the base plate 110 in an Ar atmosphere by DC magnetron sputtering with use of a vacuumed film forming device. Note that an Ar gas pressure at the film formation time was 0.6 Pa, unless otherwise described.

Specifically, as the adhesive layer 120, a 10 nm-thick Cr-50Ti film was formed. As the soft magnetic layer 130, 20 nm-thick 92(40Fe-60Co)-3Ta-5Zr films were formed with a 0.7 nm-thick Ru layer interposed therebetween. As the preliminary ground layer 140, an 8 nm-thick Ni-5W film was formed. As the first ground layer 150a, a 10 nm-thick Ru film was formed at an Ar gas pressure of 0.6 Pa. As the second ground layer 150b, an 8 nm-thick Ru—$Co_3O_4$ was formed at an Ar gas pressure of 4.5 Pa. As the main recording layer 160, a 2 nm-thick 90(70Co-10Cr-20Pt)-10 ($Cr_2O_3$) film was formed at an Ar gas pressure of 3 Pa, and thereon a 12 nm-thick 90(72Co-10Cr-18Pt)-5($SiO_2$)-5 ($TiO_2$) film was further formed at an Ar gas pressure of 3 Pa. As the split layer 170, a 0.3 nm-thick Ru film was formed. As the auxiliary recording layer 180, a 6 nm-thick 62Co-18Cr-15Pt-5B film was formed.

The protective layer 190 with a thickness of 4 nm was formed on the auxiliary recording layer 180 by using $C_2H_4$ by CVD, and a superficial layer thereof was subjected to nitriding treatment. Next, the lubricating layer 200 was formed to have a thickness of 1 nm by using PFPE (perfluoropolyether) by dip coating. In this manner, a perpendicular magnetic recording medium according to the example was manufactured.

(Comparative Example)

A perpendicular magnetic recording medium of a comparative example was formed in the same manner as the example, except that, as the first ground layer 150a, a 10 nm-thick Ru film was formed at an Ar gas pressure of 0.6 Pa, and, as the second ground layer 150b, an 8 nm-thick Ru film was formed thereon at an Ar gas pressure of 4.5 Pa.

In examination of the SNRs of the manufactured perpendicular magnetic recording medium of the example and the manufactured perpendicular magnetic recording medium of the comparative example, it was found that the SNR of the former was 18.4 dB and that of the latter was 18.0 dB, respectively. Note that the SNRs were measured by using a spin stand manufactured by Hitachi High-Technologies Corporation under a condition of 1500 kfci.

Thus, the SNR in the case where a material that constitutes the second ground layer contained the Ru—Co oxide alloy (the example) was much better than that in the case where a material that constitutes the second ground layer contained Ru (the comparative example). This is presumably because the second ground layer containing the Ru—Co oxide alloy caused high crystal orientation. Therefore, it is found that the perpendicular magnetic recording medium of the present invention could achieve a higher recording density and a higher SN ratio.

The preferred embodiment of the present invention has been described above with reference to the appended drawings, but it goes without saying that the present invention is not limited to the embodiment. It is obvious that a person skilled in the art can arrive at various modifications or alterations within the scope of claims, and those are of course understood as belonging to the technical scope of the present invention.

INDUSTRIAL APPLICABILITY

The present invention can be applied to a perpendicular magnetic recording medium installed in an HDD or the like of a perpendicular magnetic recording type and a method of manufacturing the same.

DESCRIPTIONS OF REFERENCE NUMERALS

100: Perpendicular magnetic recording medium
110: Base plate
120: Adhesive layer
130: Soft magnetic layer
140: Preliminary ground layer
150: Ground layer
150a: First ground layer
150b: Second ground layer
160: Main recording layer
170: Split layer
180: Auxiliary recording layer
190: Protective layer
200: Lubricating layer

The invention claimed is:

1. A perpendicular magnetic recording medium comprising:
a base plate, and
a laminate film including a first ground layer provided on the base plate, a second ground layer provided on the first ground layer, and a magnetic layer provided on the second ground layer and containing a magnetic material having a granular structure,
wherein the magnetic layer contains a CoCrPt alloy, and the second ground layer consists of Ru-x$Co_3O_4$, where x ranges from 0.2 mol to 5 mol,
wherein the first ground layer consists of Ru and is thicker than the second ground layer,
wherein a film thickness of the second ground layer is 8 nm-15nm,
wherein a total film thickness of the first and second ground layers is 11 nm-40 nm, and
wherein the first ground layer is formed under a first gas pressure, the second ground layer is formed under a second gas pressure, and the second gas pressure is higher than the first gas pressure.

2. The perpendicular magnetic recording medium according to claim 1, wherein the film thickness of the second ground layer ranges from 8 nm to less than 10 nm.

3. The perpendicular magnetic recording medium according to claim 1, wherein the second ground layer has a granular structure with voids formed between crystal grains that provides separation of the crystal grains and that results from formation under the condition of an Ar atmosphere at a gas pressure in the range of 3 Pa to 10 Pa, being filled with an oxide.

4. The perpendicular magnetic recording medium according to claim 1, further comprising a preliminary ground layer disposed between the base and the first ground layer.

5. The perpendicular magnetic recording medium according to claim 4, wherein the preliminary ground layer has a thickness in a range from 1 nm to 20 nm.

6. The perpendicular magnetic recording medium according to claim 4, wherein the preliminary ground layer comprises Cu, Pt, Pd, Co, Hf or an alloy containing these materials as a main component and added with at least one of V, Cr, Mo and W.

7. The perpendicular magnetic recording medium according to claim 6, wherein the preliminary ground layer comprises Co.

8. The perpendicular magnetic recording medium according to claim 1, wherein x ranges from 0.2 mol to less than 3 mol.

9. The perpendicular magnetic recording medium according to claim 1, wherein the film thickness of the second ground layer is 10 nm-15 nm.

10. The perpendicular magnetic recording medium according to claim 1, wherein x ranges from 0.2 mol to 1.25 mol.

11. The perpendicular magnetic recording medium according to claim 1, wherein x ranges from 0.2 mol to 0.6 mol.

* * * * *